Figure 2:
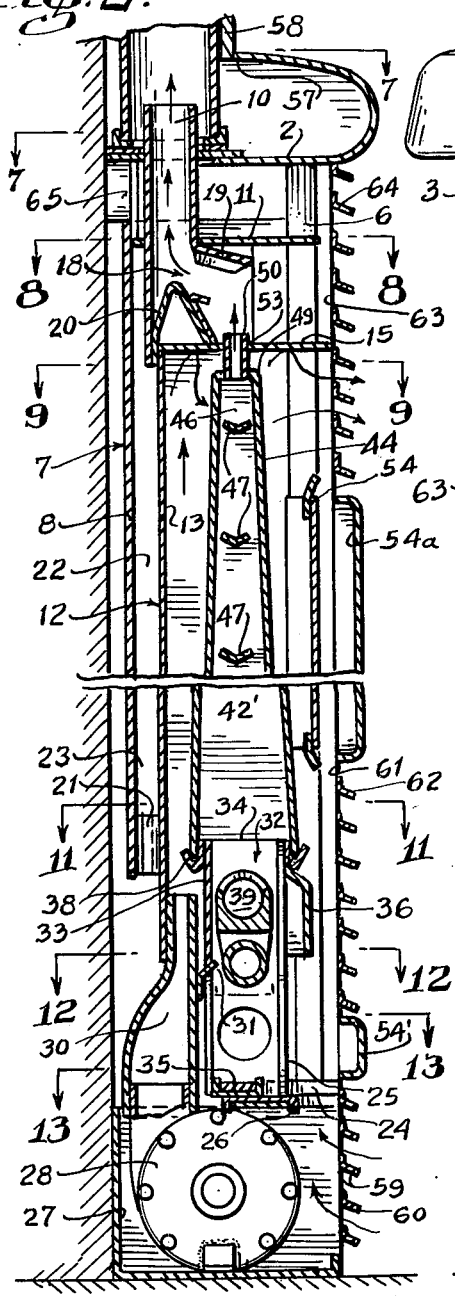

Feb. 22, 1955 — L. B. CAYOT — 2,702,539
WALL FURNACE
Filed Nov. 20, 1950 — 5 Sheets-Sheet 1
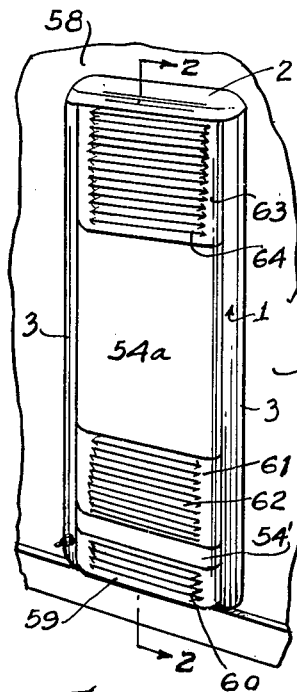
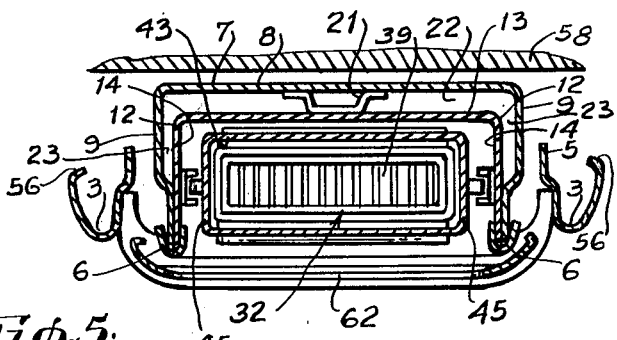
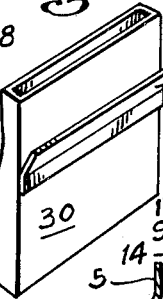
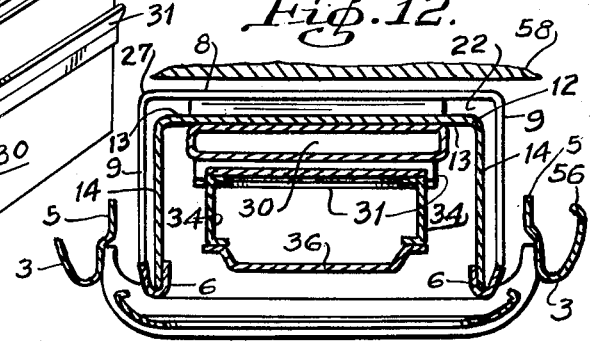
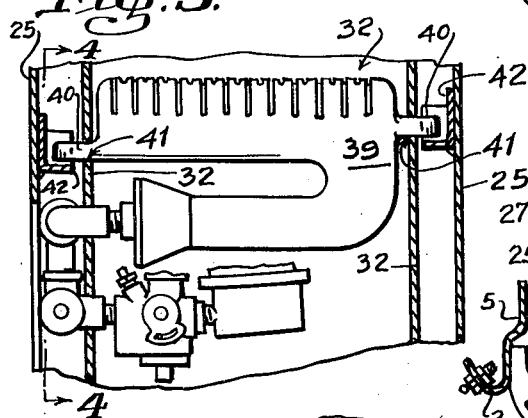
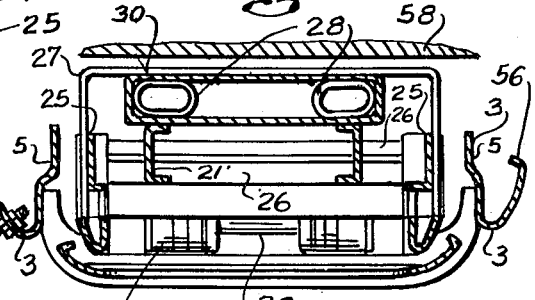
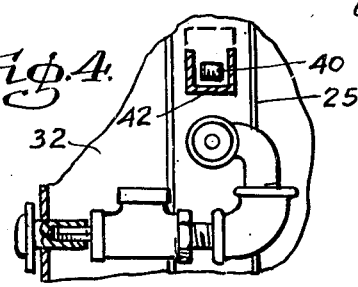
INVENTOR.
LYNN B. CAYOT
BY
ATTORNEY.

Feb. 22, 1955 — L. B. CAYOT — 2,702,539
WALL FURNACE
Filed Nov. 20, 1950 — 5 Sheets-Sheet 2

INVENTOR.
LYNN B. CAYOT
BY Philip Subkow
ATTORNEY.

Feb. 22, 1955 L. B. CAYOT 2,702,539
WALL FURNACE
Filed Nov. 20, 1950 5 Sheets-Sheet 3

INVENTOR.
LYNN B. CAYOT
BY
ATTORNEY.

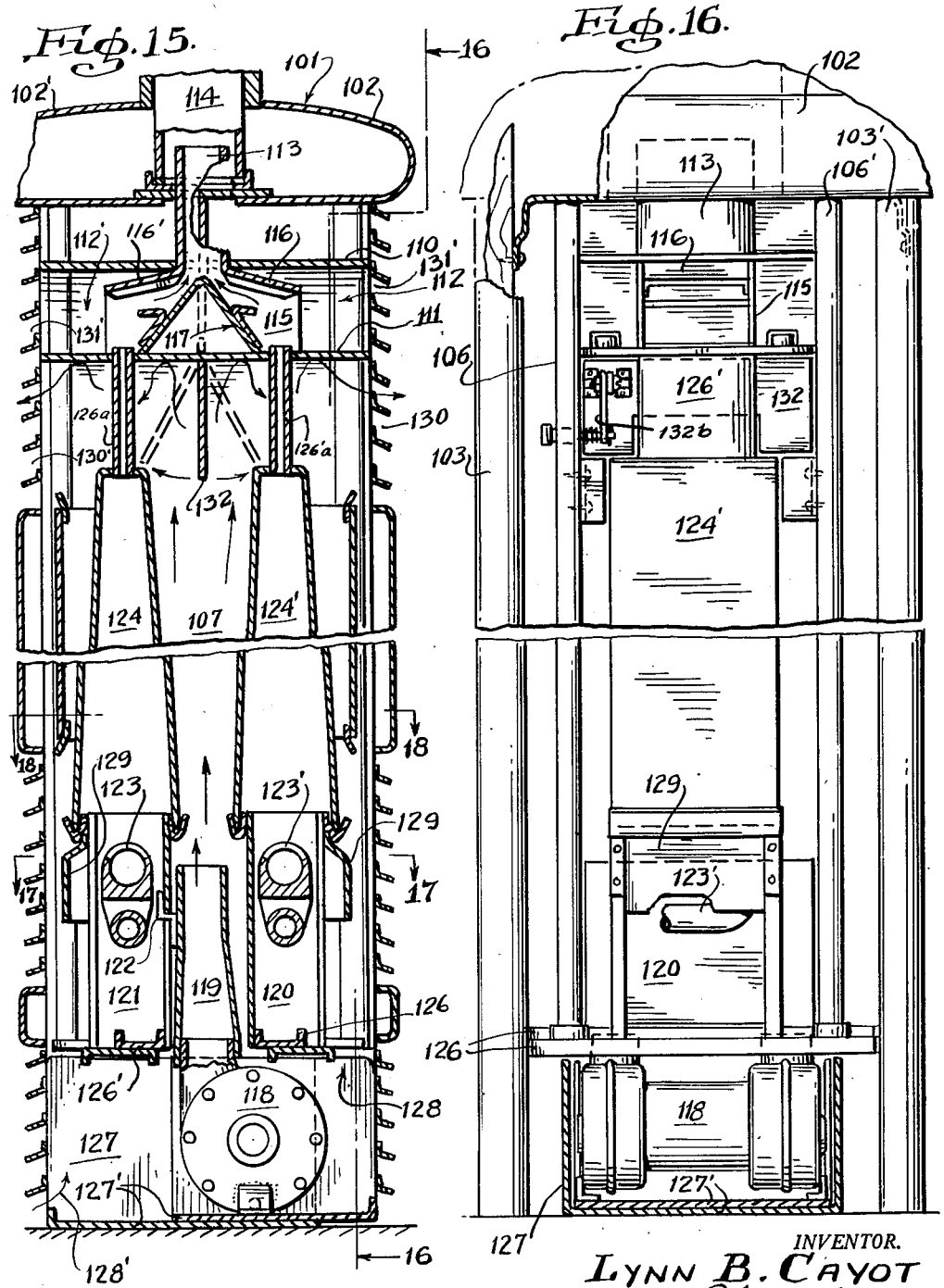

Feb. 22, 1955     L. B. CAYOT     2,702,539
WALL FURNACE

Filed Nov. 20, 1950     5 Sheets-Sheet 5

INVENTOR.
LYNN B. CAYOT
BY Philip Subkow
ATTORNEY

UNITED STATES PATENT OFFICE 2,702,539
Patented Feb. 22, 1955

2,702,539

WALL FURNACE

Lynn B. Cayot, Alhambra, Calif., assignor to Commonwealth Company, Alhambra, Calif., a copartnership Application November 20, 1950, Serial No. 196,554

8 Claims. (Cl. 126—110)

This invention relates to furnace constructions adapted to be inserted into a wall. These furnaces belong to that general type known as hot-air furnaces wherein air circulates over flues inside of which combustion gases pass. Such furnaces are in one form so constructed that they may be inserted into a wall between studs and headers provided to receive the furnace structure. Usually a grille work is provided for circulation of air from the room around the flues and back to the room. Since circulation is thus a convection of the air it may occur by thermosyphonic circulation whereby the heated air rises around the flues to be discharged through an upper grille into the room and the relatively cool air near the floor of the room enters through a lower grille, due to the draft created by the rising hot air around the flue.

It will be seen that with a hot flue positioned inside a wall structure there is a fire hazard and therefore the authorities require that the wall portions adjacent the furnace show but a few degrees rise in temperature above room temperature. In order to attain this requirement elaborate baffle systems are built into such prior art furnaces to isolate the flue from the walls by means of stagnant layers of insulating air. The structure of the furnace is thus complicated and made more costly and also made bulky and requires larger openings.

This is further complicated and aggravated by the fact that the convection obtained in such prior art furnaces depends entirely on the temperature to which the circulating air is heated, and in order to obtain adequate heating the temperature to which the flue is heated must be raised. This further complicates the baffling problem and tends to increase the furnace size.

I have designed a furnace of the hot air type which obviates these difficulties. Instead of relying on thermosyphonic circulation of a relatively high temperature, low velocity stream of heated air over the heated flue, I employ forced draft circulation. Since the total heat transferred to the circulating air per unit of time is proportional to the product of the mass of air circulated per unit of time and the temperature, I can transfer an equal or even greater amount of heat to the circulating air from the flue which is maintained at a lower superficial temperature by increasing the rate of circulation of the air at a lower circulating heated air temperature. By employing the circulating air as a blanket between the flue and the wall, I simplify the baffle system and reduce the number of baffles which I need and thus reduce the over-all dimensions of the furnace.

I have found it advantageous to vent the flue through which combustion gases pass to the discharge chimney by a vent into the room positioned near the top of the furnace. This, as I have found, will prevent any gust of wind passing down the chimney from blowing out the gas flame. This, however, presents the problem that the circulating hot air which also discharges into the room will by-pass into the flue through the vent. I have solved this problem by a unique and suitable baffle system which isolates the circulating stream of hot air from the hot combustion gases and prevents the by-passing of the circulating hot air into the flue.

In order to prevent the interference with the natural draft and circulation of air to the combustion chamber and the flue of the furnace, when I use, as I prefer, a fan for circulating the hot air over the exterior of the flue, I locate the fan discharge with relation to the air intake to the combustion chamber, or isolate the fan discharge and the circulating air, so that there is no interference, to any practical degree, with the access of air to the gas combustion chamber.

In order to facilitate construction, I employ sheet metal formed into units which interlock and mutually support each other without elaborate gaskets and pressure seals. I may thus ship the unit in a knocked-down condition and assemble it readily on the job.

Figure 6:
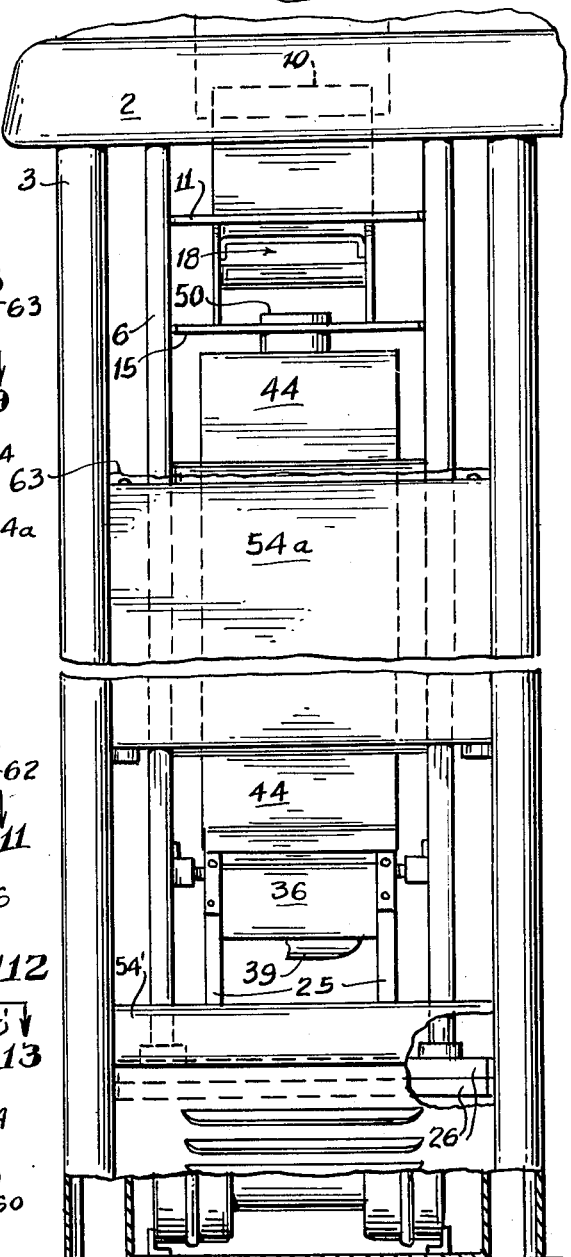
Figure 7:
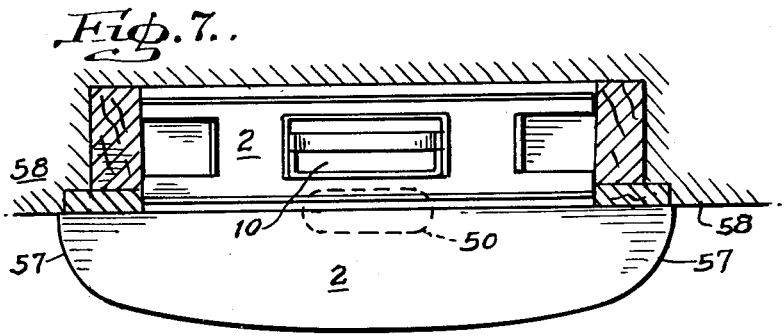
Figure 8:
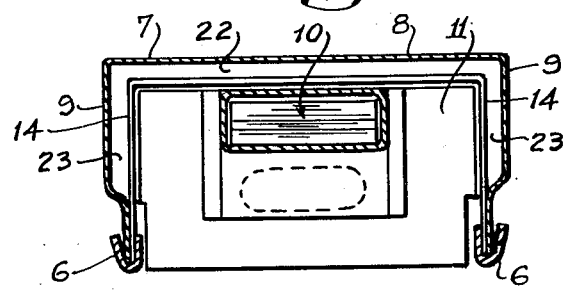
Figure 10:
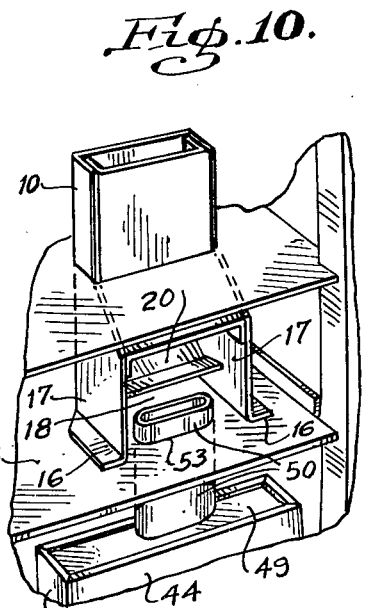
Figure 9:
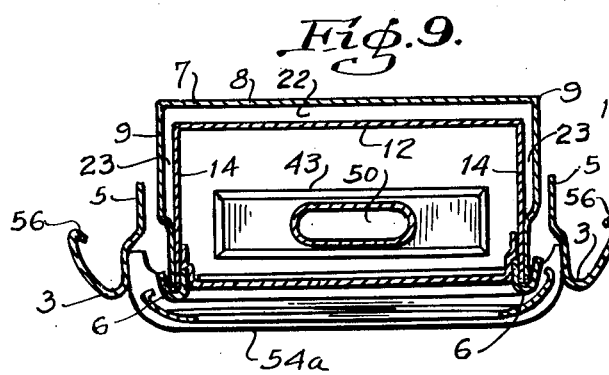
Figure 14:
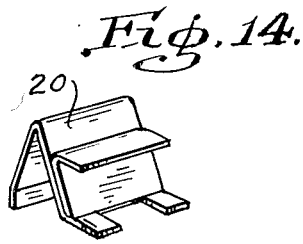
Figure 17:
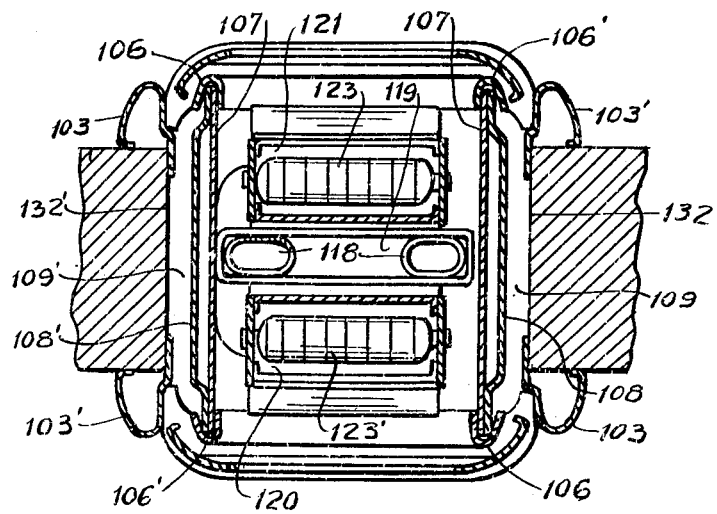
Figure 18:
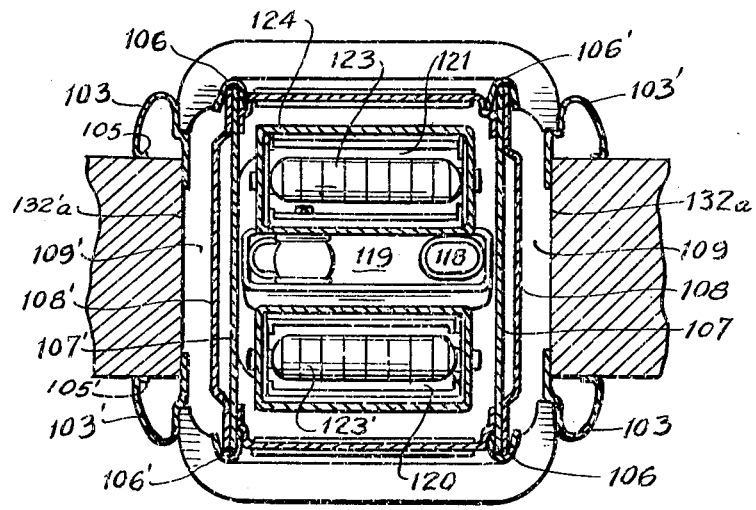

These and other objects of my invention will be further described in connection with the drawings, in which Fig. 1 is a front view of a furnace of my invention as installed in a wall;
Fig. 2 is a section taken on line 2—2 of Fig. 1;
Fig. 3 is a detail showing the burner and its support;
Fig. 4 is a fragmentary view taken on line 4—4 of Fig. 3;
Fig. 5 is a perspective view of the fan air discharge nozzle;
Fig. 6 is a front view of Fig. 2 with parts of the grille removed;
Fig. 7 is a view taken on line 7—7 of Fig. 2;
Fig. 8 is a section taken on line 8—8 of Fig. 2;
Fig. 9 is a section taken on line 9—9 of Fig. 2;
Fig. 10 is a perspective of a detail of the furnace;
Fig. 11 is a section taken on line 11—11 of Fig. 2;
Fig. 12 is a section taken on line 12—12 of Fig. 2;
Fig. 13 is a section taken on line 13—13 of Fig. 2; and
Fig. 14 is a perspective of a detail of the furnace.
Fig. 15 is a modification of said unit to adapt it to a two-way furnace;
Fig. 16 is a view on line 16—16 of Fig. 15;
Fig. 17 is a view taken on line 17—17 of Fig. 15; and
Fig. 18 is a view taken on line 18—18 of Fig. 15.

The furnace is formed of an outer frame 1 made up of a top header member 2 and side members 3 which are welded or otherwise affixed to the header 2. The header and side members are curled so as to present an arcuate and artistic exterior form. The vertical members 3 are curled to form an interior longitudinal flange 5 on the longitudinal edge of the curled vertical frame member. Vertically disposed channel members 6 are connected at their upper end to the header 2 and extend parallel to the vertically disposed frame members 3 and spaced inwardly therefrom. The lower end of the channel members 6 rest on the cross members 26 placed across the top of the box 27 at the bottom of the furnace as is more fully described below.

The external channel baffle member 7 depends from the header 2 which forms its top. The channel 7 is formed of a back 8 and side walls 9 which fit into the vertical channel members 6. A chimney 10 is positioned in a suitably provided hole in the top 2. A horizontal baffle 11 extends forwardly from the chimney, parallel to the top 2 and spaced downwardly therefrom. The legs 25 are positioned on the back of the side wall 9 and extend downwardly to rest on the cross members 26 placed across the box 27.

The internal baffle 12, formed of a back 13, side walls 14 and top 15, depends from the chimney 10 to which it is connected at the flanges 16 turned outwardly from the side walls 17 of the chimney 10 (see Fig. 10). The front longitudinal edges of the walls 14 fit in the channel 6 inside of the front edges of the walls 9 of the exterior channel baffle 8.

The chimney 10 between the baffle 11 and the top 15 has a combustion gas entrance 18 with a deflecting baffle 19 positioned at an acute angle to the top 11. A wedge-shaped member 20 (see Figs. 2 and 14) is positioned on the top 15 in alignment with the chimney 10 to form a restriction in the throat of the chimney and to provide additional baffling for the purposes described below. A spacer 21 is provided at the bottom of 8.

There is thus created a space 22 between the back walls and a space 23 between the side walls of the channel baffles 8 and 12.

At the bottom of the unit is a box 27 having an open top and front. Positioned in the box is a blower or blowers 28, suitably driven by an electric motor 29. The discharge from the blower fits into a flat nozzle 30, the discharge fitting inside and adjacent the wall 13. On the exterior of the nozzle is an elongated hook projection 31. Across the box 27 and resting on the upper edges of the sides thereof is the channel cross member 26 on which rest the legs 25 of the exterior baffle 12 and the support 24, for the lower end of the channel 6, which is suitably attached to the cross member 26 as by means of an interlock or by spot welding.

The combustion chamber 32 is formed of side wall 34 and a back 33 which extends but part-way from the top. The bottom of the side wall is cross braced by a channel member 35. Positioned on the front of the chamber at the top half thereof is an apron 36. A hook 38 is positioned on the posterior wall of the back 35. The burner 39 is positioned inside the combustion chamber and the ears 40 of the burner pass through holes 41 in the wall 32 and are supported on brackets 42 positioned in the legs 25. The combustion chamber rests on the cross members 26 with the cross member 35 positioned on 26. The hook 31 fits underneath the lower end of the back 33, thus holding the nozzle and the combustion chamber in fixed relation.

The flue member 42' is made up of an enlarged lower section which fits over the combustion chamber with the side walls 33 fitting snugly against the side walls 45 of the flue and the back wall resting in the hook member 38 and the front wall 44 resting on the top of the baffle apron 36. The flue is thus located and supported on the combustion chamber. The upper portion 46 of the flue is constricted in width, but not in length, into a flue of trapezoidal section in which is positioned a plurality of spaced baffles 47 extending across the width of the flue. The top of the flue is covered by a cover 49 to which a nozzle 50 is attached. The nozzle extends by a sliding fit through a hole 53 in the top 15.

An internal front baffle 54 is positioned at the front of the furnace and connected at its ends to the channel members 6 and thus acts also as a cross brace therefor. An external baffle 54a is positioned in front of baffle 54 and is attached at its ends to the frame members 3. A cross member 54' also interconnects the main frame members 3 below the combustion chamber.

The furnace is installed between joists of a wall with the backwardly curled flange 56 flush against the wall on either side of the joist and the curled back flange 57 of the header 2 also against the wall 58. The furnace may be secured to the joists by means of nails or screws passed through the members 3 into the joists. The front grille is then installed. This grille consists of a lower panel 59 carrying louvers 60 positioned on the floor and underneath the cross member 54'. A panel 61 carrying louvers 62 is positioned between the baffle 54a and the cross member 54'. A third panel 63 carrying louvers 64 fits on top of the panel 54a and underneath the header 2.

It will be observed that the external baffle is spaced from the walls on the back by means of a spacer 65 positioned at the upper end of the posterior surface of the back 8 and at the sides by the spacing provided by the relative position of the channel 6 and the frame members.

There is also provided an air space 22 and 23 between the interior and exterior channel baffles 7 and 12. The air circulation by means of the blower discharges into the space between the flue and the interior baffle 12 and circulates over the hot flue. It will be observed that the coldest air discharges adjacent the combustion chamber and thus the baffles 7 and 12 and the walls are shielded from the hot flame by a blanket of relatively cool moving air. As the heated air moves upward around the flue the temperature of the flue gases drops. The temperature of the hot air in the space around the flue depends on the mass velocity of the air movement, i. e., by the output of the fan. I may thus transfer a large quantity of the B. t. u. to the moving air but maintain the temperature of the moving air relatively low, and because of the relatively stagnant air in the spaces 22 and 23 and between the baffle 7 and the wall 58, the temperature of the walls may be but a few degrees above room temperature.

It will also be observed that the nozzle 30 discharges between the wall 33 and the wall 12 at a point above the bottom of the wall 33 and the bottom of the apron 36. The flue above the point of discharge is closed off from the air space around the flue. Thus the air currents moving upwardly about the flue do not interfere with the draft of air to the combustion chamber which enters through the louvers 60 and 61 and underneath the apron 36 and between the legs 32 into the combustion chamber.

The positioning of the discharge of the nozzle above the point of entry of the air into the combustion chamber thus is of importance in the proper functioning of the furnace.

The circulating hot air is deflected by the top 15 through the grille 64. This completes the circuit of the circulating air which is thus completely isolated from the combustion gas circuit.

The combustion gases discharging from the nozzle above the top 15 are deflected by the baffle 19 and the wedge 20 into the chimney 10, the draft being sufficient to maintain a sufficiently lower pressure in the chimney than is present in the room, the blower 28 being positioned sufficiently far down from the louvers 61 to avoid any cycling of the combustion gases into the room during ordinary operations. However, if a gust of wind creates a momentary pressure wave down the chimney 10, it will be discharged into the room between the baffles 15 and 11 rather than down the relatively narrow constructed nozzle 50, and thus the flame is protected against a wind which may blow it out.

By removing the backs 8 and 13 and placing a second combustion chamber and flue and grille cover on the opposite side of the nozzle 30, the furnace may be employed as a double wall furnace, the air thus circulating through the nozzle 35 above the opening to the combustion chamber between the flues and out under tops such as 15 through each of the grilles in each side of the wall.

Figs. 15 to 18, illustrate the application of the furnace to a double unit capable of heating space on both sides of a wall, as, for instance, two adjoining rooms. In order to accomplish this purpose I duplicate the unit, removing the backs of the interior and exterior baffle units 8 and 12.

Thus, in Fig. 15 the furnace 101 is formed by two outer frame members 103 and 103' placed on the opposite side of the furnace to frame the opposite side of the wall in which said furnace is to be set. A top header 102 is placed over the frame member 103 and the top header 102' over the frame member 103' similarly to that shown in the single furnace of Figs. 1 to 14, inclusive. The header and side members present the same arcuate, artistic form as described for the headers and frame members of said single furnace form.

The vertical members 103 and 103' are curled to form the interior longitudinal flanges 105 and 105', respectively. The vertically disposed channel members 106 and 106' are composed of two spaced channel members on each side of the furnace, with channel member 106 on one side opposite the channel member 106' on the same side of the furnace. The flanges 105 and 105' are connected to the headers 102 and 102'. They are similar to channel 6 shown for the previously described form of Figs. 2 and 3, and extend parallel to the vertically disposed frame members 103 and 103'. The lower ends of the channel members 106 and 106' rest on the cross members 126 and 126' placed upon the top of the box 127 which is formed with telescopic walls 127'. Depending on each side of the furnace are the vertical internal baffles 107 and 107' which extend across the furnace and longitudinally thereof, with the longitudinal edges thereof fitting into the channel members 106 and 106'. Positioned longitudinally of and across the furnace and spaced from the baffles 107 and 107' are external buffles 108 and 108' which also are curved to fit into the channels 106 and 106' and spaced from the baffles 107 and 107' to give an air space 109 and 109'. The horizontal baffle 110 extends across the top of the furnace between the baffles 108 and 108' and is spaced downwardly from the tops 102 and 102'. The baffle 111 extends across the furnace at the top of the internal baffles 107 and 107' and is spaced downwardly from the horizontal baffle 110 to provide a space 112 and 112' on both sides of the furnace between the baffles 110 and 111.

A chimney 113 passes through the baffle 110 and passed between the tops 102 into the main chimney 114. The chimney 113 is supported on walls 115 in the same manner as the chimney 10 is supported on the walls 17. Positioned across said walls and connected to the chimney are the deflecting tops 116 similar to the deflecting baffle, as shown in Fig. 2. Positioned between the side walls 115 and axially of the chimney is the deflecting wedge 117.

The blower 118 is positioned in the box 127 and carries the nozzle 119 similarly constructed to the nozzle 30. Two flues are positioned, one on either side of the nozzle and are carried upon the combustion boxes 120 and 121. These combustion boxes are constructed similarly to the combustion boxes shown in Figs. 1 to 14, inclusive, except that in the combustion box 120 the back is not cut out as in the case of the combustion box 32 and 121, but is solid. Only the combustion box 121 is positioned upon the hook 122 on nozzle 119 which is similar to the hook 31, as shown in Fig. 2. The combustion boxes 120 and 121 are positioned on the cross members 126 and 126' in the same manner as in the form of Fig. 2, and the combustion boxes are similarly positioned on the supports, one on each side of the nozzle 119.

The burners 123 and 123' are similarly constructed and positioned as the burner 39. The burners may be manifolded together if desired. The flues 124 and 124' are each similar to the flues shown in the form of Figs. 1 to 6 and 14, inclusive, and are positioned upon the fire box in the same manner. They are provided with nozzles 126a and 126'a which pass through the top 111 in a manner similar to the nozzle 49, Fig. 2, and discharge underneath the deflecting baffles 116 and 116' in the same manner, the deflecting cone 117 functioning the same way as the deflecting wedge 20.

It will be observed that there is an air entrance through the cover at 128 and 128' similarly to the entrance through 60 and the incoming air enters underneath the aprons 129 and 129' and into the combustion chambers in the same manner as described for Fig. 2. The combustion gases rise through the flues 124 and 124' and nozzles 126 and 126' into the space 112 underneath the baffles 116 and 116' and then deflected by the wedge 117 into the chimney.

The air discharging from the nozzle 119 passes between the flues 124 and 124' inside the baffles 107 and 107' to be discharged through the vents 130 and 130' underneath the top 111. The vents 131 and 131' act in the same manner as the vent 63. It will be observed that there is therefore a quiescent air layer between the baffles 107 and 108 and between 107' and 108' and between the baffle 108 and the wall 132a and between the baffle 108' and the wall 132'a. The circulating air from the nozzle passes between the baffles 107 and 107' and between the flues 124 and 124', in heat exchange therewith and discharges through the openings 130 and 130' and the distribution of this circulating air between 130 and 130' may be made by the hinged baffle 132 which is hingedly suspended on the bottom of the top 111 on a suitably provided hinge halfway between the openings 130 and 130' and is provided with means for adjusting the baffle by the tilting mechanism 132b which will tilt the baffle 132 to the right or left as shown in dotted lines.

It will also be noticed that there is an air space between the top baffle 110 and the bottom of the header 102 to also provide an air space between the top of the baffle 111 and the wall section in the same manner as in Fig. 2 between 11 and the header 2. It will also be observed that in the forms shown in Figs. 15 and 16 the discharge of the nozzle is above the point of entry of the air underneath the apron 129 in the same manner as in the form shown in Fig. 2, and that the circulation of air is thus isolated from the air entrance into the combustion chamber in the same manner.

The function of the wedge 117 and the combustion gas vent 131' into the room is provided to function in the case of a downdraft in the same manner as the wedge 20 and the vent 63 described for the form of Fig. 2.

While I have described a particular embodiment of my invention for the purpose of illustration, it should be understood that various modifications and adaptations thereof may be made within the spirit of the invention as set forth in the appended claims.

I claim:

1. A hot air furnace adapted to be set in a wall, comprising means defining an air heating chamber, a combustion chamber positioned near one end of said furnace within said air heating chamber, a combustion gas flue extending through said air heating chamber, one end of said flue being connected to said combustion chamber, said combustion chamber being provided with an air inlet, said air heating chamber having an air inlet in communication with said air heating chamber and the inlet to said combustion chamber, the walls of said air heating chamber surrounding the walls of said combustion gas flue and extending therealong in spaced relation therefrom and having a heated air outlet spaced from said heating chamber inlet, a blower near one end of said furnace having an intake and an air discharge conduit connected at one end thereof to the discharge from said blower, the other end of said discharge conduit communicating with said air heating chamber at a point spaced down stream from said combustion chamber inlet in the direction of the air flow in said air heating chamber and being directed toward said heating chamber outlet.

2. In the hot air furnace of claim 1 said air heating chamber comprising a back and sides and a front baffle member connected to the said sides, said air inlet to said air heating chamber being positioned at one end of said baffle member adjacent said combustion chamber and said air outlet positioned at the other end of said baffle member, a top to said heating chamber above said outlet, a flue gas discharge conduit connected to the other end of said flue and a flue gas outlet for said conduit spaced from said heating chamber discharge outlet, and a second gas discharge outlet for said conduit, said last-named second discharge outlet being separate from and spaced from said heating chamber outlet.

3. A hot air furnace adapted to be set in a wall comprising an elongated combustion gas flue extending through said furnace, a combustion chamber positioned near one end of said furnace and connected to one end of said combustion gas flue, an air heating conduit positioned in said furnace and surrounding said combustion gas flue and extending therealong in spaced relationship to said combustion gas flue, a heated air discharge outlet from said air heating conduit near one end of said air heating conduit, said combustion chamber having an air inlet thereto in communication with said air heating conduit near the other end of said air heating conduit, an air blower positioned near one end of said furnace, said air blower having an intake and air discharge conduit, said discharge conduit communicating with said air heating conduit at a point spaced down stream from the combustion chamber inlet and between said combustion chamber inlet and said air discharge outlet from said air heating conduit and being directed toward said air heating conduit discharge outlet.

4. In the hot air furnace of claim 3, said air heating conduit comprising back and sides and a front baffle member connected to the said sides, said air inlet to said air heating conduit being positioned at one end of said baffle member adjacent said combustion chamber and said air outlet positioned at the other end of said baffle member, a top to said conduit above said outlet, a flue gas discharge conduit connected to the other end of said flue and a flue gas outlet for said flue gas discharge conduit spaced from said heating conduit discharge outlet, and a second gas discharge outlet for said flue gas discharge conduit, said last-named second discharge outlet being separate from and spaced from said heating conduit outlet.

5. In the hot air furnace of claim 3, said air heating conduit comprising a channel member having back and sides and a front baffle member connected to the sides of the said channel, a second channel member positioned in said furnace and extending along said first channel member, said second channel member comprising a back and two sides, said back and sides being positioned exteriorly of said air heating conduit and being spaced from the back and sides of the said air heating conduit, said air inlet to said air heating conduit being positioned at one end of said baffle member adjacent said combustion chamber and said air outlet positioned at the other end of said baffle member, a top to said air heating conduit above said outlet, a flue gas discharge conduit connected to the other end of said flue and a flue gas outlet for said flue gas discharge conduit spaced from said heating conduit discharge outlet, and a second gas discharge outlet for said flue gas discharge conduit, said last-named second discharge outlet being separate from and spaced from said heating conduit outlet.

6. A hot air furnace adapted to be set in a wall, comprising means defining an air heating chamber, a pair of adjacent combustion chambers positioned near one end of said furnace within said air heating chamber, a pair of adjacent combustion gas flues spaced from each other and extending through said air heating chamber, one end of each of said flues being connected to one of said combustion chambers, said combustion chambers being each provided with an air inlet, said air heating chamber having an air inlet in communication with said air heating chamber and the inlet to each of said combustion chambers, the walls of said air heating chamber surrounding the walls of both of said combustion gas flues and extending therealong in spaced relation therefrom and having a heated air outlet spaced from said heating chamber inlet, a blower near one end of said furnace having an intake and an air discharge conduit connected at one end thereof to the discharge from said blower, the other end of said discharge conduit communicating with said air heating chamber at a point spaced down stream from each of said combustion chamber inlets in the direction of the air flow in said air heating chamber and being directed toward said heating chamber outlet.

7. A hot air furnace adapted to be set in a wall, comprising a pair of adjacent elongated combustion gas flues spaced from each other and extending through said furnace, a pair of combustion chambers positioned near one end of said furnace and each of said combustion chambers connected to one of said combustion gas flues, an air heating conduit positioned in said furnace and surrounding said combustion gas flues and extending therealong in spaced relationship to said combustion gas flues, a pair of spaced heated air discharge outlets from said air heating conduit near one end of said air heating conduit, said combustion chambers each having an air inlet thereto in communication with said air heating conduit near the other end of said air heating conduit, an air blower positioned near one end of said furnace, said air blower having an intake and air discharge conduit, said discharge conduit communicating with said air heating conduit at a point spaced down stream from the combustion chamber inlets and between said combustion chamber inlets and said air discharge from said air heating conduit and being directed toward said heating conduit outlets.

8. In the furnace of claim 7, a baffle hingedly mounted on said furnace between said air discharge outlets, and means for tilting said baffle to selectively direct the flow of heated air through said hot air discharge outlets.

References Cited in the file of this patent
UNITED STATES PATENTS

| | | |
|---|---|---|
| 2,163,928 | Andrews | June 27, 1939 |
| 2,263,732 | Johnston | Nov. 25, 1941 |
| 2,283,407 | Bassett | May 19, 1942 |
| 2,363,742 | Norton | Nov. 28, 1944 |
| 2,376,171 | Mueller | May 15, 1945 |
| 2,383,431 | Weyenberg | Aug. 21, 1945 |
| 2,484,457 | Marble | Oct. 11, 1949 |
| 2,487,775 | Cartter | Nov. 8, 1949 |
| 2,506,120 | Turner | May 2, 1950 |
| 2,576,685 | Jenson | Nov. 27, 1951 |